United States Patent [19]
Ohta et al.

[11] Patent Number: 4,779,953
[45] Date of Patent: Oct. 25, 1988

[54] OPTICAL FIBER CORD OR CABLE CONTAINING A POLYETHYLENE FILAMENT TENSILE MEMBER

[75] Inventors: Toshihiko Ohta; Fujio Okada, both of Shiga; Masahiro Hayashi, Kyoto, all of Japan

[73] Assignee: Toyo Boseki Kabushiki Kaisha, Japan

[21] Appl. No.: 885,817

[22] Filed: Jul. 21, 1986

Related U.S. Application Data

[63] Continuation of Ser. No. 686,958, Dec. 27, 1984, abandoned.

[30] Foreign Application Priority Data

Dec. 27, 1983 [JP] Japan .................. 58-248498

[51] Int. Cl.$^4$ .............................................. G02B 6/44
[52] U.S. Cl. .................. 350/96.23; 428/375; 428/394
[58] Field of Search .............. 428/364, 375, 392, 377, 428/394; 350/96.23

[56] References Cited

U.S. PATENT DOCUMENTS

| | | | |
|---|---|---|---|
| 3,865,466 | 2/1975 | Slaughter | 350/96.23 |
| 4,037,923 | 7/1977 | Beal | 350/96.23 |
| 4,093,342 | 6/1978 | Foord et al. | 350/96.23 |
| 4,097,119 | 6/1978 | Kumamaru et al. | 350/96.23 |
| 4,141,622 | 2/1979 | Beal | 350/96.23 |
| 4,166,670 | 9/1979 | Ramsay | 350/96.23 |
| 4,226,504 | 10/1980 | Bellino | 350/96.23 |
| 4,276,348 | 6/1981 | Wu | 428/364 X |
| 4,331,378 | 5/1982 | Hartig | 350/96.23 |
| 4,413,110 | 11/1983 | Kavesh et al. | 428/902 |
| 4,430,383 | 2/1984 | Smith et al. | 428/364 |
| 4,643,865 | 2/1987 | Okada et al. | 264/288.4 |

Primary Examiner—Lorraine T. Kendell
Attorney, Agent, or Firm—Jones, Tullar & Cooper

[57] ABSTRACT

An optical fiber cord or cable comprising at least one optical fiber and at least one tensile member for reinforcing said optical fiber, said tensile member comprising at least one polyethylene filament having a viscosity average molecular weight of not less than 200,000, a tenacity of not less than 20 g/d and a tensile modulus of not less than 600 g/d.

29 Claims, 2 Drawing Sheets

OPTICAL FIBER CORD OR CABLE CONTAINING A POLYETHYLENE FILAMENT TENSILE MEMBER

This is a continuation of co-pending application Ser. No. 686,958 filed on Dec. 27, 1984, now abandoned.

The present invention relates to a tensile (or tension) member of polyethylene. More particularly, it relates to a tensile member comprising a filament of ultra high molecular weight polyethylene having high tenacity and high tensile modulus and being useful as a reinforcing material for optical fiber cords or cables.

An optical fiber cord or cable comprises an optical fiber as the essential part and a tensile member as the reinforcing material. Namely, a tensile member is used for preventing an optical fiber from its breakage which will be caused by application of excessive tension thereto. Such tensile member is usually made of a material which is excellent in tensile modulus and bending rigidity.

As the tensile member for optical fiber cords or cables, there have heretofore been used metallic materials (e.g. steel wire) and also tried were plastic materials (e.g. polyethylene fiber, polypropylene fiber, polyamide fiber, polyester fiber). In general, metallic materials have sufficiently high tenacity and high tensile modulus suitable for such use. However, they have a high density, and therefore the resulting tensile member is very heavy in weight. Further, they have a problem of electromagnetic interference due to lightning strikes. Plastic materials do not have drawbacks as recognized in metallic materials; i.e. they are of light weight and do not have such problem as electromagnetic interference due to strike by lightning. However, their tenacity and tensile modulus are usually lower than those of metallic materials.

Recently, there has been provided an aromatic polyamide fiber of high tensile modulus ("Kevlar" manufactured by Du Pont). In comparison with steel wire, it is of light weight. As shown in Table 1, for instance, the weight of the aromatic polyamide fiber showing a nearly equal tenacity to that of steel wire is from 0.28 to 0.6 when the weight of steel wire is taken as 1 (this being referred to as "weight ratio"). Thus, the aromatic polyamide fiber can provide a tensile member of high tensile modulus and light weight. In order to attain a nearly equal tenacity, however, the aromatic polyamide fiber is required to have larger denier or diameter than steel wire. For instance, the diameter ratio of the aromatic polyamide fiber to steel wire is 1.24–1.8:1. Nevertheless, the aromatic polyamide fiber having large denier or diameter is hardly obtainable under the present technique, and in fact, the filament of the aromatic polyamide fiber now available on the market is less than 2 denier or less than 0.014 mm in diameter. Therefore, it is practically essential for achievement of the same level of tenacity with the aromatic polyamide fiber as steel wire to use a multiple number of filaments, i.e. a bundle of filaments.

Unfortunately, however, the tensile member using a bundle of filaments of the aromatic polyamide fiber is extremely low in bending rigidity. Although the bending rigidity can be improved by bonding said bundle of filaments together by the aid of a thermosetting plastic resin, the resultant tensile member is unfavorably increased in volume, weight ratio and diameter ratio. In addition, the tenacity and tensile modulus of such a tensile member are considerably decreased in comparison with those before bonding.

Besides, the aromatic polyamide fiber is still not enough in abrasion resistance and resistance to fatigue from flexing.

As a result of an extensive study, it has now been found that a filament made of ultra high molecular weight polyethylene and having a certain tenacity and a certain tensile modulus can provide a tensile member, particularly suitable as a reinforcing material for an optical fiber to make an optical fiber cord or cable.

Figure 1:
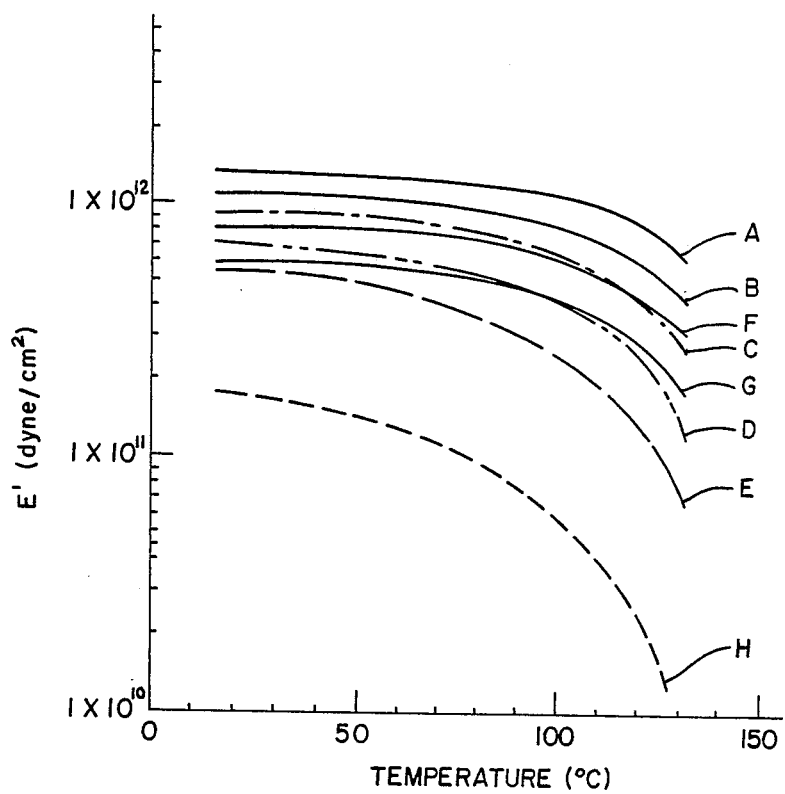
FIG. 1 is a diagram illustrating the relationship between temperature and dynamic modulus for various filaments noted in Examples 1–7 and Comparative Example 1.

According to the present invention, there is provided a tensile member comprising at least one polyethylene filament having a viscosity average molecular weight of not less than 200,000, a tenacity of not less than 20 g/d and a tensile modulus of not less than 600 g/d. There is also provided an optical fiber cord or cable comprising at least one optical fiber and at least one tensile member for reinforcing said optical fiber, said tensile member comprising at least one polyethylene filament having a viscosity average molecular weight of not less than 200,000, a tenacity of not less than 20 g/d and a tensile modulus of not less than 600 g/d.

Conventional polyethylene fibers are usually prepared by a melt spinning procedure without using any solvent. With increase of the degree of polymerization, the melt viscosity is markedly enhanced so that the spinning operation becomes difficult. Also, the increase of the degree of polymerization makes the molecular chain of polyethylene longer, and the entanglement among the molecular chains is thus increased. As a result, the orientation of the molecular chains in a certain direction by drawing after the spinning operation becomes difficult. Because of this reason, the viscosity average molecular weight of polyethylene to be melt spun is restricted to be less than 200,000. In the present invention, polyethylene to be used has a viscosity average molecular weight of not less than 200,000 and is formed in filaments by a certain specific procedure as hereinafter explained so that the resultant filaments can have high tenacity and high tensile modulus.

As stated above, polyethylene to be used in this invention should have a viscosity average molecular weight of not less than 200,000, preferably not less than 300,000, more preferably not less than 500,000, the most preferably not less than 1,000,000. A larger viscosity average molecular weight is better, because higher tenacity and higher tensile modulus can be attained. Thus, no upper limit is present on the viscosity average molecular weight. Usually, however, it may be not more than 10,000,000, particularly not more than 8,000,000, more particularly not more than 6,000,000.

The polyethylene filament should have a tenacity of not less than 20 g/d, preferably not less than 23 g/d, more preferably not less than 25 g/d, and a tensile modulus of not less than 600 g/d, preferably not less than 700 g/d, more preferably not less than 800 g/d. When these physical constants are satisfied, the polyethylene filament can provide the tensile member with performances sufficient to use as an industrial tensile member, particularly a tensile member for optical fiber cord or cable which is required to have a tensile modulus of not less than 5,000-7,000 kg/mm². When the tenacity is less than 20 g/d, a tensile modulus of not less than 600 g/d can be hardly attained In case of the tensile modulus being less than 600 g/d, the desired bending rigidity is not obtainable so that the performances as required for an industrial tensile member can not be achieved. As understood from the above descriptions, higher tenacity and higher tensile modulus are better. From the practical viewpoint, however, the maximum values for tenacity and tensile modulus are ordinarily 60 g/d and 2,000 g/d, respectively.

In addition, the polyethylene filament is favorable to have a long period spacing of not less than 200 Å, particularly of not less than 300 Å, although it is not essential.

With respect to the pure bending of an elastic bar onto which no shear force acts, the following relationship is present:

$$M = \frac{E \times I}{R} = \frac{E}{R} \times \frac{\pi D^4}{64} \quad (1)$$

wherein M is the bending moment, E is the tensile modulus (Young's modulus), I is the secondary moment at a section, R is the curvature radius at the mediate layer of the bar and D is the diameter of the bar in case of having a round section. Since the degree of bending rigidity corresponds to the bending moment, it is proportional to E and I of the product. I is determined by the geographical shape of the section of the bar. The above relationship is substantially applicable to the bending rigidity of a fiber or filament without any great error; i.e. the bending rigidity of a fiber or filament is proportional to the tensile modulus (E) and influenced by the fourth power of the diameter of the fiber or filament at a section.

Accordingly, the bending rigidity of a multi-filament (multiple filaments) is small in comparison with that of a mono-filament (single filament) when they have a nearly equal denier. When the denier of each filment of a multi-filament is smaller and the number of the filaments is increased, the multi-filament will be bent easier. When the denier of each filament is larger and the number of filaments is decreased, the multi-filament will be bent more difficultly.

In general, the tensile member having a higher bending moment, i.e. M in the formula (1), is more favorable. Thus, the tensile modulus (E), which is decided on the physical property of its material, is preferably larger. The secondary moment at a section (I) may be decided depending upon the purpose and use. When, for instance, the bending moment is the same, the secondary moment at a section (I) is smaller with a larger tensile modulus (E). In case of the material having a small density, there is obtainable a tensile member having a small section area, a light weight and a good handling property.

The filament has usually a section area of not less than 0.018 mm², preferably not less than 0.030 mm², more preferably not less than 0.05 mm². No particular upper limit is present, but it may be usually not more than 180 mm², practically not more than 8.0 mm², more practically not more than 1.8 mm².

The tensile member of the invention is characteristically small in variation of the dynamic modulus with temperature. For instance, it affords a $E'_{80° C.}/E'_{20° C.}$ value (i.e. the variation rate of the dynamic modulus at 80° C. to that at 20° C.) of not less than 60%, preferably not less than 70%, more preferably not less than 80%. Further, for instance, FIG. 1 in the accompanying drawings shows the relationship between dynamic modulus and temperature for various filaments as obtained in Examples 1 to 7 and Comparative Example 1, from which it may be understood that the filaments of the invention (A to G) are much smaller than the conventional filament of polyethylene (H) in variation of dynamic modulus within a range of 20° to 80° C. In other words, the tensile member of the invention shows only little depression in modulus even under such a high temperature as 80° C. This is quite advantageous for practical use.

The performances required for the tensile member are varied with the purpose and use. Usually, a tensile modulus of not less than 600 g/d may assure that the tensile member will be practically usable for various uses. When a tensile member is to be used for optical fiber cord or cable, the tensile modulus may be not less than 5,000-7,000 kg/mm². As understood from the formula (1), a tensile member having too small a section area is not suitable because the desired bending rigidity is hardly obtained.

The tensile member of the invention satisfies said performances required for industrial tensile members and is particularly suitable for optical fiber cord or cable. The filament has usually a section area of not less than 0.018 mm², preferably not less than 0.030 mm², more preferably not less than 0.05 mm². In comparison with conventional metallic tensile members, it is advantageous in that it has a much lighter weight and does not have a problem of electromagnetic interference due to lightning strikes.

For preparation of the filament in the invention, ultra high molecular weight polyethylene, i.e. polyethylene having a viscosity average molecular weight of not less than 200,000, preferably not less than 300,000, more preferably not less than 500,000, the most preferably not less than 1,000,000, is spun in a solution state in a solvent, and the resultant gel-like filament is subjected to drawing in one or more steps, preferably two or more steps, at a draw ratio of not less than 10, preferably not less than 20. The resultant polyethylene filament shows a tenacity of not less than 20 g/d, preferably not less than 23 g/d, more preferably not less than 25 g/d, and a tensile modulus of not less than 600 g/d, preferably not less than 700 g/d, more preferably not less than 800 g/d. When the viscosity average molecular weight is less than 200,000, said high tenacity and/or tensile modulus are hardly obtained.

Explaining said preparation procedure more in detail, ultra high molecular weight polyethylene is dissolved in a solvent (e.g. decalin, xylene, paraffin) at a temperature lower than the boiling temperature of the solvent to make a polyethylene concentration of usually from 0.5 to 50% by weight, preferably from 1 to 30% by weight. The resulting polyethylene solution is extruded through a nozzle into the air or water usually at room temperature. When desired, the polyethylene solution may be extruded into a pipe equipped with a cooling apparatus. The resultant gel-like filament, which contains the solvent therein, is heated to a temperature at which said filament is not dissolved and drawn in one or more steps at a draw ratio of not less than 10, preferably not less than 20. In the above preparation procedure, the molecular chains of polyethylene are sufficiently extended in comparison with the molecular chains in the melt extrusion spinning process. Since the entanglement of the molecular chains is little in the spinning and/or solidified state, the drawing can be attained with a high draw ratio.

Figure 2:
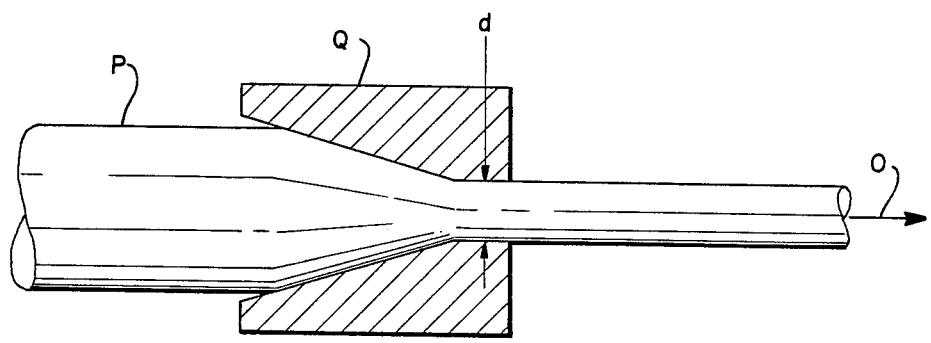
FIG. 2 is a schematic view partially in cross section of a draw die through which a bundle of gel-like filaments are drawn.

At the spinning step, a nozzle having a hole(s) of of appropriate size to give the filament(s) having a desired section area or denier may be chosen, and usually the one which can afford the filament(s) having 0.5 denier (diameter at section, 0.0085 mm) or more is employed. When a filament of particularly large denier is desired, the gel-like filaments extruded through the nozzle holes may be bundled, heated and drawn to give an integrally combined filament. Heating may be made at such a temperature that the gel-like filaments are not readily cut. For the heating, there may be used a drawing apparatus with a hot plate, a heating apparatus of non-contact type with hot air or the like. A typical example of the draw die usable for this purpose is shown in FIG. 2. This Figure shows the enlarged schematic view of the section of the draw die, and O indicates the direction in which the filament proceeds, P is a bundle of the gel-like filaments, Q is a draw die and d is the diameter of the hole of the draw die. The gel-like filaments (P) containing the solvent is supplied to the draw die (Q) having a conical introduction port are passed therethrough, whereby an integrally combined filament is obtained.

Alternatively, the filament of the invention may be prepared by dissolving ultra high molecular weight polyethylene in a solvent and cooling the resultant solution to produce gel-like particles. The gel-like sheet composed of gel-like particles is compressed to remove a portion of the solvent therefrom and then drawn, whereby a filament is obtained.

Figure 3:
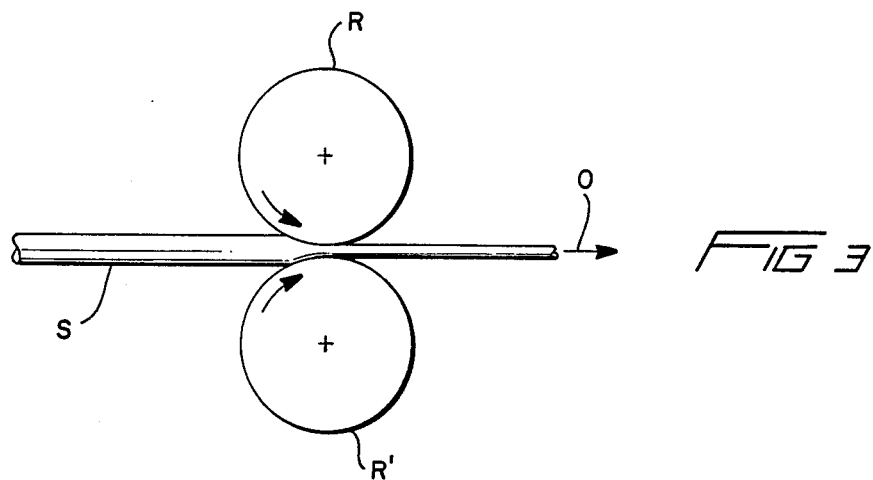
FIG. 3 is a schematic view of a pair of squeezing rollers for squeezing a gel-like sheet.
Figure 4:
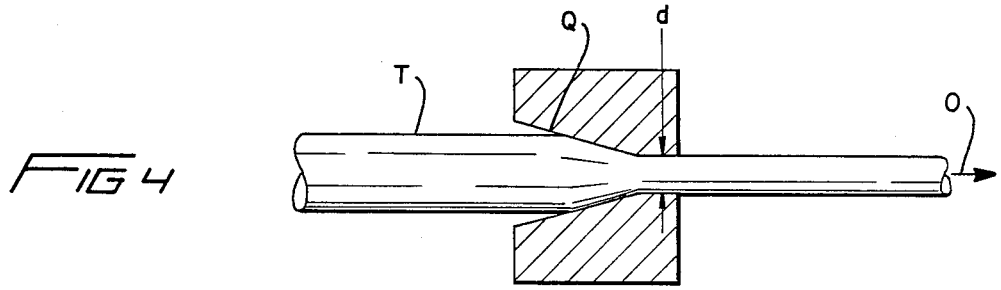
FIG. 4 is a schematic view partially in cross section of a draw die through which a compressed gel-like sheet is drawn.

Explaining this procedure more in detail, ultra high molecular weight polyethylene is dissolved in a solvent (e.g. decalin, liquid paraffin) while heating to make a polyethylene concentration of 0.5 to 15% by weight. The resulting solution is cooled so that gel-like particles or their collective blocks are formed. When desired, the gel-like particles or their collective blocks are broken to make them finer. The resultant dispersion is filtered, for instance, by the use of a filtration apparatus such as a paper machine to make a gel-like sheet. The gel-like sheet is squeezed, for instance, by passing through the gap between two rollers, which are disposed so as to apply a certain load thereto, to remove a portion of the solvent therefrom. A typical example of the squeezing manner is shown in FIG. 3 wherein R and R' are rotating rollers, S is a gel-like sheet and O indicates the direction in which the gel-like sheet proceeds. Namely, the gel-like sheet (S) is passed through the gap between two rotating rollers (R, R'), whereby the gel-like sheet (S) is compressed and simultaneously a portion of the solvent is squeezed out. The thus compressed sheet is then drawn at a ratio of not less than 20. On drawing, the use of a die with a hole having an appropriate sectional shape can afford the filamant of desired section shape such as round. The die as usable is provided preferably with a hole having a section area smaller than that of the compressed sheet to be supplied thereto and a conical introducing port which makes drawing easier. For die drawing, the compressed sheet as folded or rolled is supplied to the die and protruded through the die so heated as to carry out the drawing at an appropriate (e.g. 90° to 130° C.) lower than the melting point of the supplied sheet. A typical example of the die is shown in FIG. 4. This Figure shows the enlarged schematic view of the section of the die, and O indicates the direction in which the compressed sheet proceeds, T is the compressed sheet, Q is the die and d is the diameter of the hole of the die. The compressed sheet (T) containing the solvent is folded and supplied to the draw die (Q) having a conical introduction port and passed therethrough, whereby a shaped product having a round section is obtained. For obtaining the filament of sufficiently high tensile modulus, the product as once drawn may be further subjected to die drawing through a die having a hole of smaller section area than that of the hole in the die as previously drawn. Alternatively, the once drawn product may be subjected to heat drawing without using a die.

The thus obtained filament has a section corresponding to the section of the hole of the die used. No crack is observed at the section. Thus, it is compact and of even quality and has a high tenacity of 20 g/d or more and a high tensile modulus of 600 g/d or more. Further, it can have a great section area.

Figure 5:
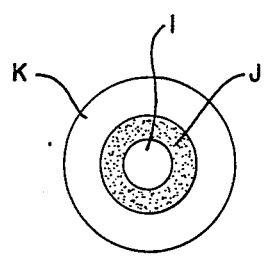
FIG. 5 is a cross section of filament in accordance with the present invention.
Figure 6:
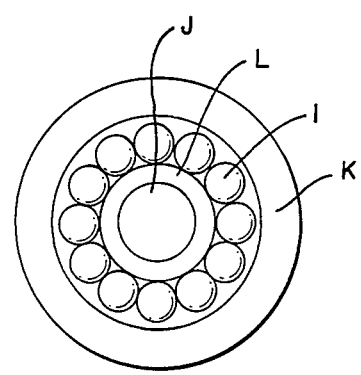
FIG. 6 is a cross section of another filament in accordance with the present invention.

As stated above, the filament is useful as a tensile member and particularly suitable as a reinforcing material for an optical fiber to make an optical fiber cord or cable. For this purpose, there may be used one or more filaments. One typical example of the structure of the optical fiber cord or cable is shown in FIG. 5. This Figure shows a schematic view of the section of the optical fiber cord; the jacketed optical fiber (I) is located at the central portion and surrounded by a multiple number of the filaments of the invention to make a tensile member layer (J), which is covered by a protective layer (K) made of a plastic material such as a vinyl chloride resin or a metallic material. Another typical example is shown in FIG. 6. This Figure shows a schematic view of the section of the optical fiber cable; the filament (J) of the invention as the tensile member is jacketed with a protective layer (L) made of a plastic material such as a urethane resin and further surrounded by a multiple number of the optical fibers (I). The outside is covered by a protective layer (K) made of a plastic material such as polyethylene or a metallic material.

The tensile member of the invention has high tenacity and high tensile modulus. It has a somewhat larger diameter ratio (e.g. 1.20-1.86) than steel wire and a much smaller weight ratio (0.18 to 0.42) than steel wire. Compared with the aromatic polyamide fiber, it is excellent in abrasion resistance and resistance to fatigue from flexing. In comparison with steel wire and the aromatic polyamide fiber, it is excellent in chemical resistance, particularly resistance to acidic substances. Therefore, those conventional tensile members are apt to be deteriorated during their application in the air or under the ground, while no material deterioration is observed on the tensile member of the invention. It is particularly notable that the tensile member of the invention can be made in the having a large section area with high tenacity and high tensile modulus. Thus, the bending rigidity is excellent.

Practical and presently preferred embodiments of the invention are illustratively shown in the following Examples wherein part(s) and % are by weight unless otherwise indicated. Measurement of various physical constants was carried out in the following manner:

(1) Viscosity average molecular weight ($\overline{M}v$):

The viscosity was measured on the decalin solution at 135° C. according to the method as described in ASTM D2857 to determine the intrinsic viscosity [$\eta$], which was then introduced into the following equation to calculate the viscosity average molecular weight ($\overline{M}v$):

$$\overline{M}v = 3.64 \times 10^4 \times [\eta]^{1.39}$$

(2) Tenacity:

Measured by the constant speed elengation method as described in JIS (Japan Industrial Standard) L1013 (1981).

(3) Tensile modulus:

Measured by the initial resistance to stretching method as described in JIS L1013 (1981).

(4) Diameter ratio and weight ratio of tensile member:

The diameter ratio and weight ratio of the tensile member were determined taking the diameter and weight of the steel wire having a nearly equal tensile modulus (20,000 kg/mm$^2$) to that of the tensile member respectively as 1.

(5) Density:

Measured by the gradient density tube method as described in JIS L1013 (1981), 7.14.2.

(6) Dynamic modulus E' (dyne/cm):

The dynamic modulus E' was measured from 20° to about 160° C. while heating with a driving frequency of about 110 Hz and a temperature elevation rate of about 1° C./mm$^2$ by the use of a direct reading dynamic viscoelastic tester "VIBRON" Model DDV-II or "RHEOVIBRON" Model DDV-III (manufactured by Toyo Sokki) to obtain the dynamic modulus-temperature characteristics.

The dynamic modulus at 80° C. ($E'_{80°C.}$) and at 20° C. ($E'_{20°C.}$) as determined above were introduced into the following formula to obtain the $E'_{80°C.}/E'_{20°C.}$ rate (%):

$$(E'_{80°C.}/E'_{20°C.}) \times 100$$

(7) Long period spacing of fiber:

Using an X ray diffraction apparatus "Rotar Flex" (manufactured by Rigaku Denki), the small angle X ray scattering strength curve was measured under the following conditions, and the long period spacing was calculated from the position of the peak:

Detector: PSPC (proportional counter probe manufactured by Rigaku Denki);
Camera radius: 510 mm;
PSPC resolving power: 0.007°/ch
Tube voltage of X ray producing apparatus: 45 Kv
Tube current of X ray producing apparatus: 50 mA
First pinhole slit: 0.15 mm (diameter)
Second pinhole slit: 0.15 mm (diameter)
Size of beam stopper: 1.7 mm wide
Measurement time: 5 minutes

EXAMPLE 1

Polyethylene ($\overline{M}v$, $2 \times 10^6$) was dissolved in decalin at 160° C. to make a spinning liquid having a polyethylene concentration of 5%. The spinning liquid kept at 130° C. was extruded through a nozzle having round holes, each hole having a diameter of 2 mm, into the air of room temperature, followed by cooling to make gel-like filaments. A bundle of seventeen gel-like filaments was drawn in four steps at four different temperatures under which the gel-like filaments were not cut. Namely, drawing was carried out under the following conditions to give a total draw ratio of 75:

| Step | Temperature (°C.) | Draw ratio |
|------|-------------------|------------|
| 1st  | 80                | 5          |
| 2nd  | 110               | 4          |
| 3rd  | 130               | 2.5        |
| 4th  | 140               | 1.5        |

The drawn filaments gave an appearance of a monofilament due to melt-combining, and the section of the monofilament was an oval shape and had a sectional area of 0.0328 mm$^2$ (corresponding to a circle having a diameter of 0.204 mm), a long axis of 0.22 mm and a short axis of 0.19 mm. According to the denier method, it may be expressed as 287 denier. The characteristic values of the monofilament are as shown in Table 1 wherein those of conventional steel wire and conventional synthetic fibers are also shown for comparison.

The monofilament of this Example is remarkably of light weight in comparison with conventional steel wire. Since it has such a large diameter as 287 denier, the bending moment is higher than those of Kevlar 29 and Kevlar 49. The dynamic modulus at 80° C. is 94.2% of that at 20° C. In comparison with conventional polyethylene for manufacture of fibers as shown in Reference Example 1, it can keep the modulus at a much higher temperature. The long period spacing was 550 Å.

EXAMPLE 2

Polyethylene ($\overline{M}v$, $2 \times 10^6$) was dissolved in decalin at 160° C. to make a spinning liquid having a polyethylene concentration of 6%. The spinning liquid kept at 130° C. was extruded through a nozzle having round holes, each hole having a diameter of 2.5 mm, into the air of room temperature, followed by cooling to make gel-like filaments. A bundle of sixty-three gel-like filaments was drawn in four steps at four different temperatures under which the gell-like filaments were not cut. Namely, drawing was carried out under the following conditions to give a total draw ratio of 65:

| Step | Temperature (°C.) | Draw ratio |
|------|-------------------|------------|
| 1st  | 80                | 5.5        |
| 2nd  | 110               | 3.8        |
| 3rd  | 130               | 2.4        |
| 4th  | 140               | 1.3        |

The drawn filaments gave an appearance of a monofilament due to melt-combining, and the section of the monofilament was an oval shape and had a sectional area of 0.0271 mm$^2$ (corresponding to a circle having a diameter of 0.587 mm), a long axis of 0.65 mm and a short axis of 0.53 mm. According to the denier method, it may be expressed as 2362 denier. The characteristic values of the monofilament are as shown in Table 1 wherein those of conventional steel wire and conventional synthetic fibers are also shown for comparison.

The monofilament of this Example has such a large diameter as 2362 denier and it exhibits a high tenacity as well as a high tensile modulus. The dynamic modulus at 80° C. is 89.3% of that at 20° C. and the long period spacing is 530 Å.

EXAMPLE 3

Polyethylene ($\overline{Mv}$, $1 \times 10^6$) was dissolved in decalin at 160° C. to make a spinning liquid having a polyethylene concentration of 10%. The spinning liquid kept at 130° C. was extruded through a nozzle having round holes, each hole having a diameter of 2 mm, into the air of room temperature, followed by cooling to make gel-like filaments. A bundle of nine gel-like filaments was drawn in four steps at four different temperatures under which the gel-like filaments were not cut. Namely, drawing was carried out under the following conditions to give a total draw ratio of 72:

| Step | Temperature (°C.) | Draw ratio |
|---|---|---|
| 1st | 80 | 5.5 |
| 2nd | 110 | 4 |
| 3rd | 125 | 2.5 |
| 4th | 135 | 1.3 |

The drawn filaments gave an appearance of a monofilament due to melt-combining, and the section of the monofilament was an oval shape and had a sectional area of 0.0361 mm² (corresponding to a circle having a diameter of 0.214 mm), a long axis of 0.23 mm and a short axis of 0.20 mm. According to the denier method, it may be expressed as 314 denier. The characteristic values of the monofilament are as shown in Table 1 wherein those of conventional steel wire and conventional synthetic fibers are also shown for comparison.

The monofilament of this Example has an average molecular weight of 1,000,000 and exhibits a high tenacity as well as a high tensile modulus. The dynamic modulus at 80° C. is 85.4% of that at 20° C. and the long period spacing is 480 Å.

EXAMPLE 4

Polyethylene ($\overline{Mv}$, $5 \times 10^5$) was dissolved in decalin at 160° C. to make a spinning liquid having a polyethylene concentration of 15%. The spinning liquid kept at 130° C. was extruded through a nozzle having round holes, each hole having a diameter of 2 mm, into the air of room temperature, followed by cooling to make gel-like filaments. A bundle of seven gel-like filaments was drawn in four steps at four different temperatures under which the gel-like filaments were not cut. Namely, drawing was carried out under the following conditions to give a total draw ratio of 60:

| Step | Temperature (°C.) | Draw ratio |
|---|---|---|
| 1st | 80 | 5 |
| 2nd | 110 | 4 |
| 3rd | 125 | 2 |
| 4th | 135 | 1.5 |

The drawn filaments gave an appearance of a monofilament due to melt-combining, and the section of the monofilament was an oval shape and had a sectional area of 0.0509 mm² (corresponding to a circle having a diameter of 0.255 mm), a long axis of 0.27 mm and a short axis of 0.24 mm. According to the denier method, it may be expressed as 443 denier. The characteristic values of the monofilament are as shown in Table 1 wherein those of conventional steel wire and conventional synthetic fibers are also shown for comparison.

The monofilament of this Example has an average molecular weight of 500,000 and exhibits a high tenacity as well as a high tensile modulus. In order to afford the same tenacity as that of the conventional steel wire, the ratio of diameter and the weight ratio should become 1.66 and 0.34, respectively. The dynamic modulus at 80° C. is 76.9% of that at 20° C. and the long period spacing is 340 Å.

EXAMPLE 5

Polyethylene ($\overline{Mv}$, $2.4 \times 10^5$) was dissolved in decalin at 160° C. to make a spinning liquid having a polyethylene concentration of 18%. The spinning liquid kept at 130° C. was extruded through a nozzle having round holes, each hole having a diameter of 2 mm, into the air of room temperature, followed by cooling to make gel-like filaments. A bundle of eleven gel-like filaments was drawn in four steps at four different temperatures under which the gel-like filaments were not cut. Namely, drawing was carried out under the following conditions to give a total draw ratio of 59:

| Step | Temperature (°C.) | Draw ratio |
|---|---|---|
| 1st | 80 | 7 |
| 2nd | 110 | 3.5 |
| 3rd | 125 | 2 |
| 4th | 135 | 1.2 |

The drawn filaments gave an appearance of a monofilament due to melt-combining, and the section of the monofilament was an oval shape and had a sectional area of 0.0980 mm² (corresponding to a circle having a diameter of 0.353 mm), a long axis of 0.39 mm and a short axis of 0.32 mm. According to the denier method, it may be expressed as 846 denier. The characteristic values of the monofilament are as shown in Table 1 wherein those of conventional steel wire and conventional synthetic fibers are also shown for comparison.

The monofilament of this Example has an average molecular weight of 240,000, exhibits a high tenacity as well as a high tensile modulus and shows a yarn size of 846 denier. The dynamic modulus at 80° C. is 67.2% of that at 20° C. and the long period spacing is 260 Å.

EXAMPLE 6

Polyethylene ($\overline{Mv}$, $2 \times 10^6$) was dissolved in decalin at 160° C. to make a spinning liquid having a polyethylene concentration of 4%. The spinning liquid kept at 130° C. was extruded through a nozzle having round holes, each hole having a diameter of 0.7 mm, into water of 30° C. to make gel-like filaments. A bundle of one hundreds and eighty gel-like filaments, which contained decalin in 94.5% and a sectional area of each filament was 0.71 mm², were drawn 2 times in length by the aid of the die as shown in FIG. 2 of the accompanying drawing and taken up. The temperature of the die was kept at 80° C. during the operation. The drawn gel-like filaments were passed through a hot-air bath of 130° C. so as to draw 8.8 times and further a hot-air bath of 140° C. so as to draw 2 times, the total draw ratio being 35, to obtain a drawn filament substantially containing no decalin.

The thus drawn fiber gave an appearance of a monofilament due to melt-combining, and the section of the monofilament was a round shape and had a sectional area of 0.205 mm² (corresponding to a circle having a diameter of 0.511 mm). According to the denier method, it may be expressed as 1790 denier. The characteristic values of the monofilament are as shown in Table 1.

The monofilament of this Example exhibits a high tenacity as well as a high tensile modulus. The dynamic modulus at 80° C. is 88.1% of that at 20° C. and the long period spacing is 470 Å.

EXAMPLE 7

Polyethylene ($\overline{M}v$, $2 \times 10^6$) was dissolved in decalin at 160° C. to make a solution having a polyethylene concentration of 3%. The resultant solution was allowed to cool at room temperature for 10 hours to make a gel-like material, followed by pulverization by the aid of a homomixer. The thus prepared material comprised gel-like particles and a solvent, the average particle size of the particles being 80 u. After removal of the solvent by filtration, the particles were allowed to stand on a filter cloth, whereby a gel-like sheet of 4 mm in thickness was obtained. The gel-like sheet still contained the solvent, in which the polyethylene concentration being 16%, and showed a melting point of 92° C. The gel-like sheet on the filter cloth was permitted to go through between two metal rolls rotating at even speed under compression to eliminate the solvent, whereby a compressed sheet was obtained. The diameter of the rolls was 150 mm, each rolls being spaced by a distance of 0.7 mm, and a rotating speed was 7 times/minute. The compression was carried out at room temperature (ca. 27° C.).

The compressed sheet contained polyethylene in a concentration of 48%, had a thickness of 0.6 mm and a width of 200 mm and showed a high strength as not breaking even at bending. The sheet was supplied to a draw die while plaiting in a width of 15 mm for drawing and taken up at a speed of 0.5 m/minute. The draw die was provided with a round sectional hole, of which the diameter and the length were respectively 4 mm and 5 mm, and a cone-shaped conduit, the half angle of the cone being 10°, of 40 mm in length and kept at 110° C.

The compressed sheet passed through the draw die was drawn 9.4 times in lengthwise direction and had a round section. Scarce crack on the section could be found so that there hardly imagined that the compressed sheet was made from a sheet-like material.

The thus obtained compressed sheet was further permitted to go through between a hot-air bath of 135° C. and subjected to a conventional drawing method under heating by the aid of two rolls having different rotating speed so as to obtain a desired hard drawn monofilament, which had a round section of 1.1 mm. The characteristic values of the monofilament are as shown in Table 1.

Although the monofilament of this Example has a yarn size of 8,322 denier, it exhibits a high tenacity as well as a high tensile modulus. The dynamic modulus at 80° C. is 87.2% of that at 20° C. and the long period spacing is 450 Å.

REFERENCE EXAMPLE 1

Polyethylene ($\overline{M}v$, $6.5 \times 10^4$) was dissolved in decalin at 160° C. to make a spinning liquid having a polyethylene concentration of 50%. The spinning liquid kept at 130° C. was extruded through a nozzle having round holes, each hole having a diameter of 2 mm, into the air of room temperature, followed by cooling to make gel-like filaments. A bundle of gel-like filaments was drawn in four steps at four different temperatures under which the gel-like filaments were not cut. Namely, drawing was carried out under the following conditions to give a total draw ratio of 56:

| Step | Temperature (°C.) | Draw ratio |
|---|---|---|
| 1st | 80 | 8 |
| 2nd | 100 | 3 |
| 3rd | 120 | 1.8 |
| 4th | 130 | 1.3 |

The drawn filaments had a sectional area of 0.0267 mm² (corresponding to a circle having a diameter of 0.184 mm), a long axis of 0.20 mm and a short axis of 0.17 mm. According to the denier method, it may be expressed as 230 denier. The characteristic values of the monofilament are as shown in Table 1.

The average molecular weight of the monofilament of this Example is $6.5 \times 10^4$ and is inferior in tenacity and tensile modulus. The dynamic modulus at 80° C. is 56.6% of that at 20° C. and the heat resistance of the filaments is not so good. The long period spacing is so short as 180 Å.

TABLE 1

| | Average molecular weight ($\overline{M}v$) | Density (g/cm³) | Tenacity g/d | Tenacity kg/mm² | Tensile modulus g/d | Tensile modulus kg/mm² | Tensile member Ratio of diameter | Tensile member Weight ratio | Dynamic modulus (dyne/cm²) E' 80° C. | Dynamic modulus (dyne/cm²) E' 20° C. | E' 80° C./E' 20° C. (%) | Long period spacing (Å) |
|---|---|---|---|---|---|---|---|---|---|---|---|---|
| Steel wire | — | 7.81 | 5 | 350 | 285 | 20000 | 1 | 1 | — | — | — | — |
| Kevlar 29 | — | 1.44 | 25 | 325 | 478 | 6200 | 1.8 | 0.6 | — | — | — | — |
| Kevlar 49 | — | 1.44 | 21 | 270 | 1000 | 13000 | 1.24 | 0.28 | — | — | — | — |
| Polyester fiber | — | 1.38 | 8 | 100 | 161 | 2000 | 3.2 | 1.8 | — | — | — | — |
| Nylon fiber | — | 1.14 | 9 | 92 | 49 | 500 | 6.3 | 5.8 | — | — | — | — |
| Polyethylene fiber | — | 0.96 | 9 | 78 | 98 | 850 | 4.9 | 2.9 | — | — | — | — |
| Example 1 | $2 \times 10^6$ | 0.973 | 44 | 385 | 1590 | 13924 | 1.20 | 0.18 | $1.30 \times 10^{12}$ | $1.38 \times 10^{12}$ | 94.2 | 550 |
| Example 2 | $2 \times 10^6$ | 0.970 | 40 | 349 | 1250 | 10913 | 1.35 | 0.23 | $1.00 \times 10^{12}$ | $1.12 \times 10^{12}$ | 89.3 | 530 |
| Example 3 | $1 \times 10^6$ | 0.968 | 34 | 296 | 1120 | 9757 | 1.43 | 0.25 | $8.20 \times 10^{11}$ | $9.60 \times 10^{11}$ | 85.4 | 480 |
| Example 4 | $5 \times 10^5$ | 0.963 | 28 | 243 | 840 | 7280 | 1.66 | 0.34 | $5.57 \times 10^{11}$ | $7.24 \times 10^{11}$ | 76.9 | 340 |
| Example 5 | $2.4 \times 10^5$ | 0.060 | 21 | 181 | 670 | 5789 | 1.86 | 0.42 | $3.85 \times 10^{11}$ | $5.73 \times 10^{11}$ | 67.2 | 260 |
| Example 6 | $2 \times 10^6$ | 0.970 | 35 | 301 | 962 | 8400 | 1.54 | 0.30 | $7.31 \times 10^{11}$ | $8.30 \times 10^{11}$ | 88.1 | 479 |
| Example 7 | $2 \times 10^6$ | 0.973 | 24 | 210 | 680 | 6042 | 1.82 | 0.41 | $5.23 \times 10^{11}$ | $6.00 \times 10^{11}$ | 87.2 | 450 |
| Reference | $6.5 \times 10^4$ | 0.958 | 11 | 95 | 203 | 1750 | 3.38 | 1.40 | $9.9 \times 10^{10}$ | $1.75 \times 10^{11}$ | 56.6 | 180 |

TABLE 1-continued

| | Average molecular weight ($\overline{M}v$) | Density (g/cm³) | Tenacity | | Tensile modulus | | Tensile member | | Dynamic modulus (dyne/cm²) | | E' 80° C./E' 20° C. (%) | Long period spacing (Å) |
|---|---|---|---|---|---|---|---|---|---|---|---|---|
| | | | g/d | kg/mm² | g/d | kg/mm² | Ratio of diameter | Weight ratio | E' 80° C. | E' 20° C. | | |
| Example 1 | | | | | | | | | | | | |

What is claimed is:

1. An optical fiber cord or cable comprising at least one optical fiber and at least one tensile member for reinforcing said optical fiber, each tensile member comprising at least one polyethylene filament having a viscosity average molecular weight of not less than 200,000, a tenacity of not less than 20 g/d, a tensile modulus of not less than 600 g/d, a viscosity rate of the dynamic modulus at an elevated temperature ($E'_{80°\ C.}$) to that at room temperature ($E'_{20°\ C.}$) of not less than 60%, and a section area of not less than 0.018 mm².

2. The optical fiber cord or cable according to claim 1, which comprises an optical fiber or a bundle of optical fibers and a plurality of tensile members surrounding the optical fiber or the bundle of optical fibers.

3. The optical fiber cord or cable according to claim 1, which comprises a tensile member or a bundle of tensile members and a plurality of optical fibers surrounding the tensile member or the bundle of tensile members.

4. The optical fiber cord or cable according to claim 1, 2, or 3, which has a protective shell at the outside.

5. The optical fiber cord or cable according to claim 4, wherein the protective shell is made of a metallic material.

6. The optical fiber cord or cable according to claim 4, wherein the proective shell is made of a plastic material.

7. The optical fiber cord or cable according claim 1, wherein the viscosity average molecular weight is not less than 300,000.

8. The optical fiber cord or cable according to claim 1, wherein the viscosity average molecular weight is not less than 1,000,000.

9. The optical fiber cord or cable according to claim 1, wherein the tenacity is not less than 23 g/d.

10. The optical fiber cord or cable according to claim 1, wherein the tenacity is not less than 25 g/d.

11. The optical fiber cord or cable according to claim 1, wherein the tensile modulus is not less than 700 g/d.

12. The optical fiber cord or cable according to claim 1, wherein the tensile modulus is not less than 800 g/d.

13. The optical fiber cord or cable according to claim 1, wherein the viscosity average molecular weight is not less than 300,000, the tenacity is not less than 23 g/d and the tensile modulus is not less than 700 g/d.

14. The optical fiber cord or cable according to claim 1, wherein the polyethylene filament has a section area of not less than 0.03 mm².

15. The optical fiber cord or cable according to claim 1, wherein the polyethylene filament has a section area of not less than 0.05 mm².

16. The optical fiber cord or cable according to claim 1, wherein the variation rate of the dynamic modulus at an elevated temperature ($E'_{80°\ C.}$) to that at room temperature ($E'_{20°\ C.}$) is not less than 60%.

17. The optical fiber cord or cable according to claim 1, wherein the viscosity average molecular weight is not less than 500,000.

18. An optical fiber cord or cable comprising an optical fiber or a bundle of optical fibers and a plurality of tensile members surrounding the optical fiber or the bundle of optical fibers, each tensile member comprising at least one polyethylene filament having a viscosity average molecular weight of not less than 200,000, a tenacity of not less than 20 g/d, a tensile modulus of not less than 600 g/d and a variation rate of the dynamic modulus at an elevated temperature ($E'_{80°\ C.}$) to that at room temperature ($E'_{20°\ C.}$) of not less than 60%, and a section area of not less than 0.018 mm².

19. The optical fiber cord or cable according to claim 18, which has a protective shell at the outside.

20. The optical fiber cord or cable according to claim 18, wherein the protective shell is made of plastic material.

21. The optical fiber cord or cable according to claim 18, wherein the viscosity average molecular weight is not less than 300,000.

22. The optical fiber cord or cable according to claim 18, wherein the viscosity average molecular weight is not less than 1,000,000.

23. The optical fiber cord or cable according to claim 18, wherein the tenacity is not less than 23 g/d.

24. The optical fiber cord or cable according to claim 18, wherein the tenacity is not less than 25 g/d.

25. The optical fiber cord or cable according to claim 18, wherein the tensile modulus is not less than 700 g/d.

26. The optical fiber cord or cable according to claim 18, wherein the tensile modulus is not less than 800 g/d.

27. The optical fiber cord or cable according to claim 18, wherein the viscosity average molecular weight is not less than 300,000, the tenacity is not less than 23 g/d and the tensile modulus is not less than 700 g/d.

28. The optical fiber cord or cable according to claim 18, wherein the variation rate of the dynamic modulus at an elevated temperature ($E'_{80°\ C.}$) to that at room temperature ($E'_{20°\ C.}$) is not less than 70%.

29. The optical fiber cord or cable according to claim 18, wherein the viscosity average molecular weight is not less than 500,000.

* * * * *